United States Patent
Hardy et al.

(10) Patent No.: US 7,614,042 B1
(45) Date of Patent: Nov. 3, 2009

(54) SYSTEM AND METHOD FOR SELECTING APPLICABLE TESTS IN AN AUTOMATION TESTING SYSTEM

(75) Inventors: Donald G. Hardy, Seattle, WA (US); Curtis D. Anderson, Kent, WA (US); Patrick J. Niemeyer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 11/041,341

(22) Filed: Jan. 21, 2005

(51) Int. Cl.
G06F 9/44 (2006.01)
(52) U.S. Cl. ..................................... 717/124
(58) Field of Classification Search .......... 717/124–128
See application file for complete search history.

(56) References Cited

U.S. PATENT DOCUMENTS

| | | | |
|---|---|---|---|
| 6,427,000 B1 * | 7/2002 | Mumford et al. ............... | 379/9 |
| 6,505,342 B1 * | 1/2003 | Hartmann et al. ........... | 717/104 |
| 6,654,950 B1 * | 11/2003 | Barnishan ................... | 717/136 |
| 6,694,509 B1 * | 2/2004 | Stoval et al. ................ | 717/124 |
| 6,895,578 B1 * | 5/2005 | Kolawa et al. .............. | 717/130 |
| 6,986,125 B2 * | 1/2006 | Apuzzo et al. ............... | 717/124 |
| 7,167,870 B2 * | 1/2007 | Avvari et al. ................. | 707/102 |
| 7,287,242 B2 * | 10/2007 | Chang ......................... | 717/124 |
| 7,334,219 B2 * | 2/2008 | Cebula et al. ............... | 717/124 |
| 2004/0088602 A1 * | 5/2004 | Cohen et al. .................. | 714/38 |
| 2005/0071818 A1 * | 3/2005 | Reissman et al. ........... | 717/127 |
| 2005/0166094 A1 * | 7/2005 | Blackwell et al. ............ | 714/38 |
| 2006/0277439 A1 * | 12/2006 | Davia et al. .................... | 714/38 |

OTHER PUBLICATIONS

U.S. Appl. No. 11/041,477, entitled *System and Method for Automation Testing and Validated*, filed Jan. 21, 2005 by Hardy et al.
U.S. Appl. No. 11/041,340, entitled *System and Method for Allocating Automation Testing Resources Based on Projections*, filed Jan. 21, 2005 by Niemeyer et al.
Amitabh Srivastava, et al.; "*Effectively Prioritizing Tests in Development Environment*"; 2002 ACM; pp. 97-106.

* cited by examiner

*Primary Examiner*—Wei Y Zhen
*Assistant Examiner*—Chih-Ching Chow
(74) *Attorney, Agent, or Firm*—Merchant & Gould, P.C.

(57) ABSTRACT

Automation test selection is made for an automation testing process according to the code changes that have occurred between builds of a software product. A mapping between the available tests and source tree locations of the files is maintained. The mapping allows the appropriate tests to be selected for the code changes that have been made, resulting in a more focused automation testing process.

19 Claims, 4 Drawing Sheets

Source Tree Locations     Build Verification Tests

Source Tree Locations          Build Verification Tests

= Code Change

SYSTEM AND METHOD FOR SELECTING APPLICABLE TESTS IN AN AUTOMATION TESTING SYSTEM

CROSS-REFERENCE TO RELATED APPLICATIONS

The present invention is related to patent applications entitled: "System and Method for Automation Testing and Validation" having Ser. No. 11/041,477, filed Jan. 21, 2005, and "System and Method for Allocating Automation Testing Resources Based on Projections" having Ser. No. 11/041,340, filed Jan. 21, 2005. The related applications are assigned to the assignee of the present patent application and are hereby incorporated by reference.

BACKGROUND OF THE INVENTION

Test automation systems are used to automatically test software. Software testing using an automatic test program generally avoids the errors that humans make when they tire after multiple repetitions. For example the automation test program provides consistent test execution and does not skip or add any tests by mistake. The testing program can perform the functions much quicker then a normal human being using the product, and can record the results of the test accurately. The results are automatically fed into a database that may provide useful statistics on how well the software development process is going.

Currently, for most software projects, thorough automation is not even executed before developers check in their code. Automation has been traditionally limited to testing code after it has been checked in due to time constraints related to testing code changes before they are checked in.

Automation testing also becomes problematic for large-scale software development projects. As the project size increases, the time required to run the automation lengthens. At a certain point, the time required to run the automation is so long that running the automation for the code changes has become prohibitively time consuming. Large-scale software development projects may have numerous developers making code changes that affect code in other parts of the project. Without comprehensive testing of each of the code changes, the software project may take on bugs and errors in one area that impacts one or more related areas. The late cycle discovery of the dependencies introduces project delays because of the time required to back out the problematic code. Systems have been developed to provide sufficient resources to reduce the time constraints for running automation tests on code changes before the code is checked in. However, many of the time reduction advantages are lost due to lack of knowledge by developers of which automation tests to run. As often is the case, many developers may end up with prohibitively long automation testing time requirements, simply because they selected a host of unnecessary tests to run.

SUMMARY OF THE INVENTION

Aspects of the present invention are related to a system and method that automatically selects a set of applicable tests to run against a build of a software product. In accordance with one aspect of the present invention, the automation tests selected are the automation tests that correspond to the files in the build that are identified as including code changes or affected by code changes. In accordance with one aspect of the present invention, a mapping exists between source tree locations of the files and the automation tests. The mapping dictates which tests to run when a code change affects a file in a particular source tree location. Utilizing the mapping, the tests to run against a particular build may be determined so that the testing of the build is more targeted to automation tests applicable to the developer's changes.

In accordance with one aspect of the present invention, a method is provided for selecting automation tests to run in an automation testing process for a software product. A determination is made whether a file is associated with a change of code in the software product. When the file is associated with a code change, a source tree location is determined for the file. Another determination is made whether the source tree location of the file is mapped to at least one of the automation tests. The automation tests that are mapped to the source tree location of the file are then selected, and a list that includes the selected automation tests is provided to the automation testing process. The automation tests selected are the automation tests run against a build of the software product when the build of the software product is tested.

Yet another aspect of the present invention is directed to an automation test selection system that includes a computing device, a first set of logic and second set of logic included in the computing device, and an automation manager coupled to the computing device. The first set of logic is arranged to send code change information that corresponds to files of a software product that have code changes. The second set of logic is arranged to convert the code change information to a request that describes components of the software product for which automation testing is needed. The automation manager returns a set of automation tests to the second set of logic in response to the request, wherein the set of automation tests is forwarded to the first set of logic that uses the set of automation tests to verify a build of the software product.

DETAILED DESCRIPTION OF THE PREFERRED EMBODIMENT

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
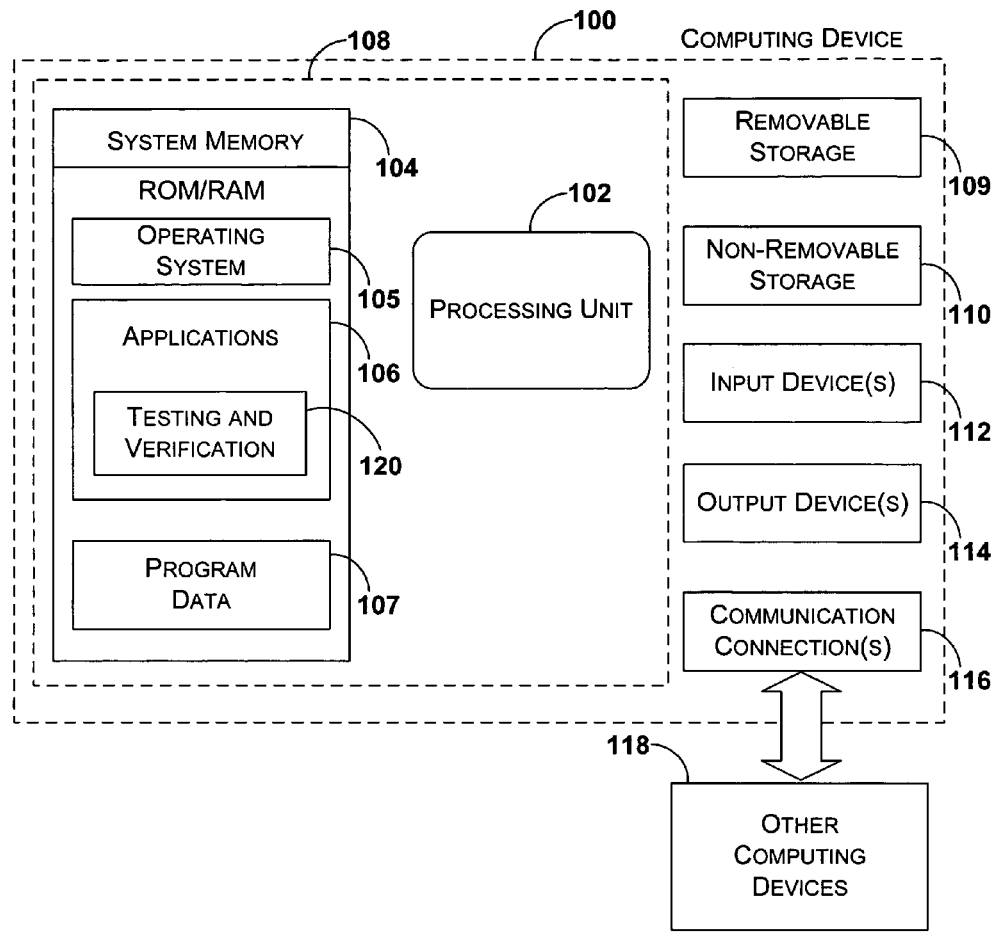
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. In one embodiment, applications 106 further include a test selection application 120 that, in combination with the other portions of computing device 100, provides the functionality for implementing the present invention. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System and Method for Test Selection

Aspects of the present invention are related to selecting applicable automation tests for running against builds of a software product to verify code changes made by a developer. The present invention may be provided within the context of an automation testing and verification system that allows a developer to perform hours of automation testing in a relatively short period of time. One such system is described in a patent application entitled, "System and Method for Automation Testing and Verification" that is referenced in the cross-reference to related applications section. The related invention takes the individual build that the developer has produced on their local computing device and runs a pre-selected set of automation tests against that build using allocated resources. A method for allocating the resources based on projected need and other factors is described in the patent application entitled, "System and Method for Allocating Automation Testing Resources Based on Projections" that is also referenced in the cross-reference to related applications section. Both of these patent applications are hereby incorporated by reference in their entirety.

The present invention provides the method that intelligently selects the set of automation tests from a list of available automation tests. In accordance with the present invention, the set of automation tests to run against a particular build are the automation tests to the portion of a build that correspond to the code changes used to create the build. In one embodiment, the automation tests are selected according to the source tree location of the files corresponding to the code changes and the type of changes being made.

Figure 2:
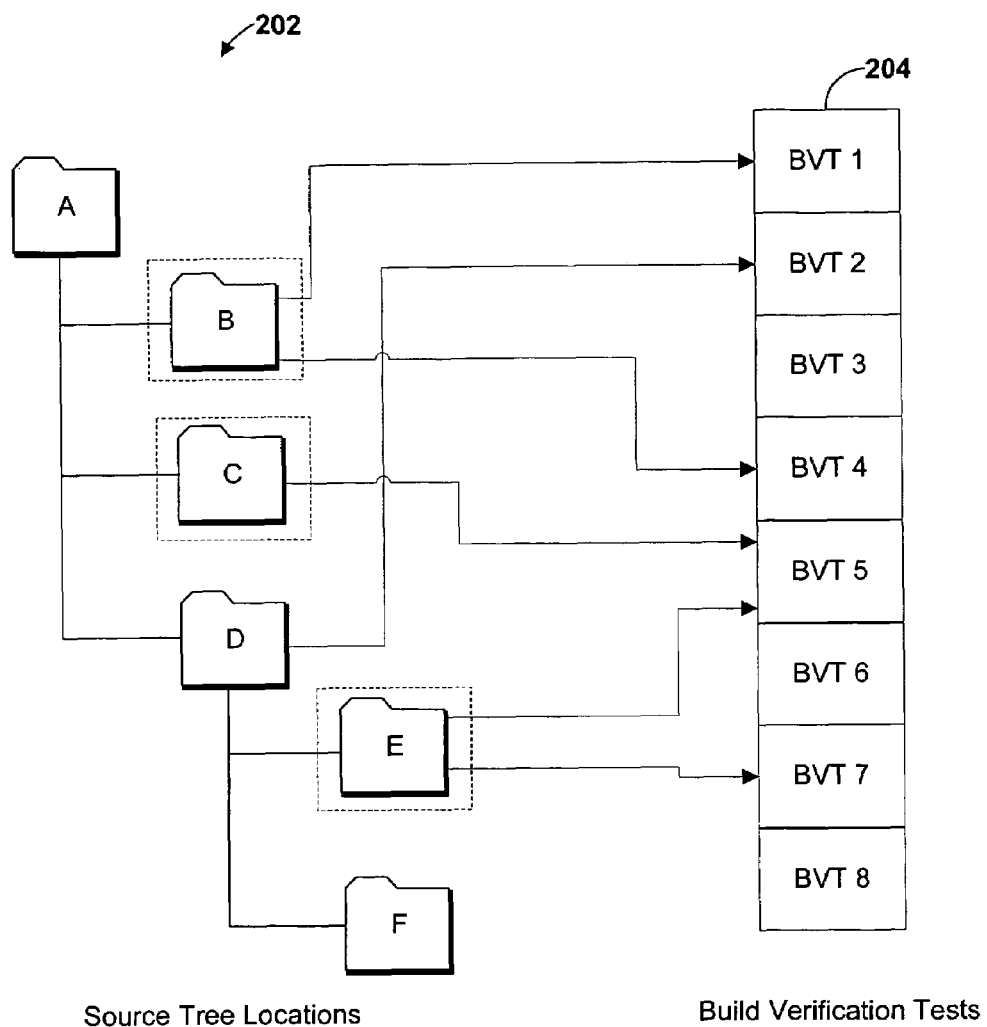
FIGS. 2 and 3 are illustrations of mappings between specified source tree locations and automation tests provided in accordance with the present invention.
Figure 2:
Figure 3:
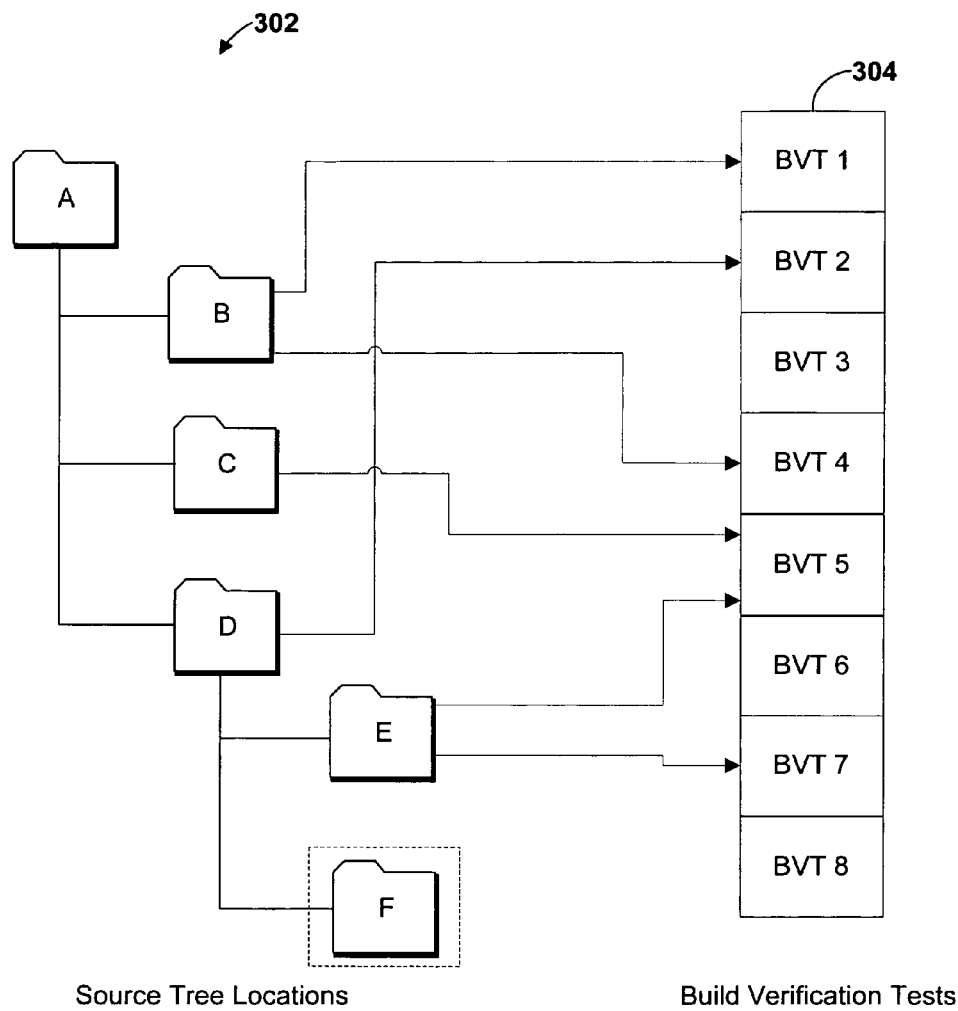
Figure 3:

FIGS. 2 and 3 are illustrations of mappings between specified source tree locations and automation tests provided in accordance with the present invention.

In FIG. 2 various mappings are shown between source tree locations 202 and build verification tests (BVTs) 204. In one embodiment, the BVTs represent the subset of all available tests that have been approved and validated for use with an automation process provided in accordance with the present invention. For example, many thousands of automation tests may be available, but only a few hundred of those tests qualify as BVTs. Of those tests, the tests that indicate that they target source tree locations associated with a code change are the tests selected for the automation process. The present invention also has the ability to limit test selection to enabled tests, tests enabled for certain language, verified tests, and according to other criteria associated with the tests.

The locations of source tree 202 that have associated code changes or may be affected by code changes made by a developer are illustrated by a dashed rectangle. In the example shown, locations B, C, and E each have code changes or may be affected by code changes made elsewhere. In one embodiment, the source tree locations determined to have associated code changes are discovered by querying a version control system associated with the software product. Typically a version control system organizes a software product into many, possibly thousands, of source files. When a developer chooses to work on a particular source file, that source file is checked out of the version control system by the developer. With the checked out source files, and depending the permissions granted, the developer is able to make changes and create a build of the software product that includes their changes. To determine the locations that have associated code changes or may be affected by a code change, the present invention merely determines which source files have been checked out. In one embodiment, all source files checked out are considered to have associated code changes, whether actual code changes occurred or not.

Each location of source tree 202 may correspond to a specific file or other data type. As the locations of source tree 202 are discovered to have changes or to be affected by changes, mappings between these locations and the BVTs 204 determine which of the BVTs to select to run against the build. The selected set of BVTs to test, correspond to the source tree locations that have associated code changes or are affected by code changes elsewhere. In the example shown, the BVTs selected to run are BVT 1, BVT 4, BVT 5, and BVT 7. Note that BVT 5 is mapped by more than one of the source tree locations. In one embodiment, BVT 5 remains listed only once amongst the set of BVTs to run against the build despite the duplicate mapping.

By aggregating the locations of the source tree that have code changes or are affected by code changes, an aggregated list of BVTs to run is generated. The aggregated list of BVTs provided from this determination may then be used to test the software product with a much more targeted list of automation tests to run.

FIG. 3 illustrates the same set of mappings shown in FIG. 2, however the location of source tree 302 that corresponds to a code change or is affected by a code change is location F. Location F has no mapping to one of the BVTs 304. A location of the source tree may have no associated mapping when a change to the code in that location does not affect the application to which it is associated. For example, a word processing application may have various associated readme.txt files. A change to the readme.txt files does not affect a change in the word processing application itself that would result in an error. Accordingly, the readme.txt does not need code verification or testing performed when it is changed. Additionally there are files that can be changed that change the actually binaries generated by the build, but still have are no corresponding BVTs to select. This scenario may correspond to a feature that needs a BVT and doesn't yet have one, or perhaps it is not a feature that is covered by a BVT and is instead covered by one of the non-BVT automation tests. It may also be that a BVT needs to be created to run an automation that encompasses that file. Other situations may also arise that result in an undefined mapping for a source tree location.

In another embodiment, the present invention provides a "best match" behavior for the mappings between the source tree locations 302 and the BVTs 304. The best match behavior determines an optimal set of automation tests to run against a file with code changes given the location of the file in the source tree. For example, location F is not explicitly matched to any BVTs. Instead, when a change occurs to file corresponding to location F, location F is implicitly mapped to the best match among the BVTs. In the example provided, the best match for location F might be the BVTs associated with location E, since location E is at the same level and has the same dependencies within the source tree locations 302.

In FIGS. 2 and 3 above, despite the illustration of the source tree locations being mapped directly to the BVTs, the source tree locations may instead be mapped to criteria the defines the available automation tests.

In one embodiment, the mappings of the source tree locations to the automation tests are stored as entries in a data file on the developer's computing device. The following data represents a data file that provides some example mappings between source tree locations and automation tests that correspond to the present invention:

| | |
|---|---|
| rcsProjectX | => {TestableComponent1 } |
| rcsProjectX/ documentation | => { } |
| rcsProjectY | => {TestableComponent1, TestableComponent2} |

Figure 4:
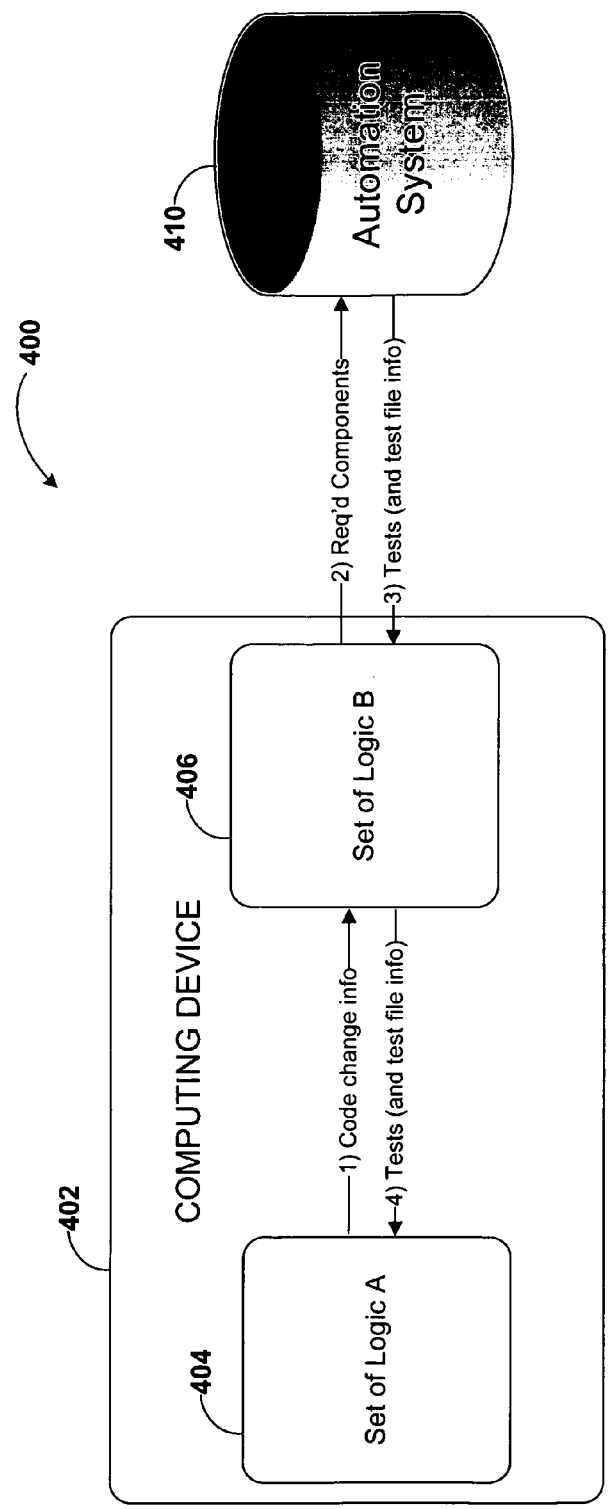
FIG. 4 illustrates a block diagram of exemplary data flow for a test selection process in accordance with the present invention.

As may be seen from the example mappings above, a direct mapping exists between a file (located in rcsProjectX) and a single automation test (TestableComponent1). Additionally, a direct mapping also exists between a file (located in rcsProjectY) and multiple automation tests (TestableComponent1 and TestableComponent2). Furthermore, a file (located in rcsProjectX/documentation) may have no direct mapping to a BVT and selects no BVTs to run against a build despite a change in the file. For the best matching behavior, a file (e.g., rcsProjectX/foo) selects the automation tests that the source tree location (rcsProjectX) including the file selects. The mappings shown are not an exhaustive list, and as more files are generated and have undefined mappings, the mapping for these files and their associated source tree locations may be added FIG. 4 illustrates a block diagram of exemplary data flow for a test selection process in accordance with the present invention. System 400 includes a computing device 402 in communication with an automation system 410. Computing device 402 includes a set of logic A 404 and a set of logic B 406.

In one embodiment, set of logic A 404 is associated with a set of logic for running an automation testing and validation process. In one example, set of logic A 404 is initiated when a developer working on computing device 402 has a build of a software product located on computing device 402 and desires to test the build. When set of logic A 404 is initiated, set of logic A 404 sends code change information to set of logic B 406. The code change information corresponds to which of the source tree locations has an associate code change or is affected by a code change. Set of logic B 406 takes the code change information and converts it into a description of the components for which the automation tests are requested. The request is forwarded from set of logic B 406 to automation system or automation manager 410. Automation system 410 returns the list of the selected BVTs and any additional test file information. Set of logic B 406 forwards this information to set of logic A 404 which can then verify the selected tests and proceed with generating a job request for running the selected automation tests against the build of the software product. In an additional embodiment, the build of the software product may also contain changes to the tests executed. The second call into the automation system queries the system and find out what tests are to be run. Therefore if a change happened to one of the tests to be run, these tests may then be include among the automation tests for execution. For example, a developer makes a change that modifies how toolbars work and runs a job containing that change. Without modifying the automation tests for the toolbar, the toolbar tests fail when the automation tests are run. With the present invention, the developer is able to modify those tests that evaluate toolbar functionality and include the modified tests in their verification job so they honor the new toolbar behavior as valid before the automation tests are run. It is contemplated that in other embodiments, system 400 may have other topologies than the topology shown herein without departing from the spirit and scope of the invention.

In one embodiment, the process described in FIG. 4 is repeated for creating a job request that is supplied to an array of lab machines. The array of lab machines is used to run the actual automation tests against the build of the software product that reflects the code changes. In concept, the process described in FIG. 4 determines which automation tests to select and the repeat of the process during job creating actually selects those tests.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for selecting automation tests to run in an automation testing process for a software product, comprising:

querying a version control system to determine when a file is checked out; wherein the file checked out is considered to have a code change regardless of whether an actual code change has occurred;

in response to determining that a file is checked out:

automatically determining code change information by identifying a location of the code change within the file;

after determining the code change information, automatically converting the code change information to a description of components of the software product for which automation testing is needed; wherein testing may not be needed for a portion of the components of the software product;

automatically determining a source tree location of the file;

automatically determining whether the source tree location of the file is mapped to at least one of the automation tests by examining a mapping file that includes a direct mapping from a source tree location of the checked out file to an automated test; wherein the mapping dictates the automation tests to be run in response to the code change that affects the checked out file at the particular source tree location;

automatically selecting the automation tests that are identified within the mapping file, the selection determining build verification tests mapped to the source tree location of the file, wherein build verification tests are configured to be run while code is checked out of the source tree; wherein the build verification tests are a subset of the automation tests;

automatically providing a list of the selected automation tests to the automation testing process;

automatically running the selected automation tests against a build of the software product, such that the build of the software product is compiled with the code change in the checked out file and the build of the software product is tested by the build verification tests; wherein the build is a local build that is produced while the file is checked out.

2. The computer-implemented method of claim 1, further comprising determining whether a file has an associated change of code in the software product.

3. The computer-implemented method of claim 2, wherein the file has an associated change of code when the file includes a code change.

4. The computer-implemented method of claim 2, wherein the file has an associated change of code when the file is affected by a code change made elsewhere in the software product.

5. The computer-implemented method of claim 1, wherein the mappings of the source tree locations to the automation tests are stored as entries in the mapping file.

6. The computer-implemented method of claim 1, further comprising:

updating a selected automation test run against the build of the software product when the change of code corresponds to a change of behavior for the software product; and running the updated selected automation test against the build of the software product.

7. The computer-implemented method of claim 1, further comprising repeating determining a source tree location of a file, determining whether the source tree location of the file is mapped to at least one of the automation tests, selecting the automation tests that are mapped to the source tree location of the file; and providing a list of the selected automation tests to the automation testing process when a new job request is generated during the automation testing process.

8. An automation test selection system, comprising:

a computing device;

a first set of logic included in the computing device and a second set of logic included in the computing device, wherein the first set of logic is arranged to automatically determine code change information by identifying a source tree location of the code change within a checked out file; after the code change information is determined, automatically send the code change information that corresponds to files of a software product that have code changes to the second set of logic;

wherein the second set of logic is arranged to automatically convert the code change information to a request that describes components of the software product for which automation testing is needed, wherein testing may not be needed for a portion of the components of the software product; and is arranged to automatically forward the request that describes the software product for which automation testing is needed to an automation manager;

wherein the automation manager is coupled to the computing device and returns a set of automation tests to the second set of logic in response to the forwarded request;

wherein the source tree location of the checked out file is mapped to at least one of the automation tests by examining a mapping file that includes a direct mapping from a source tree location of the checked out file to an automated test, the mapping dictates the automation tests to be run in response to the code change that affects the checked out file at the particular source tree location;

automatically selecting the automation tests that are identified within the mapping file, the selection determining build verification tests mapped to the source tree location of the file wherein build verification tests are configured to be run while code is checked out of the source tree; wherein the build verification tests are a subset of the automation tests;

wherein the set of automation tests is forwarded to the first set of logic that automatically generates a job request to run the set of automation tests to verify a build of the software product, wherein the files of the software product having code changes are used during compilation of the components of the build of the software product.

9. The system of claim 8, wherein the first set of logic is further arranged to repeat sending the code change information when new job request is created during execution of the first set of logic.

10. The system of claim 8, wherein the components of the software product for which automation testing is needed correspond to source tree locations associated with code changes.

11. A computer-readable storage medium including computer-executable instructions for selecting automation tests to run in an automation testing process for a software product, the computer-executable instructions comprising:

determining whether a file is associated with a change of code in the software product wherein the file is checked-out of a version control system;

automatically determining a source tree location of a file when the file is associated with a change of code in the software product;

after determining the code change information, automatically converting the code change information to a description of components of the software product for which automation testing is needed; wherein testing may not be needed for a portion of the components of the software product;

automatically determining whether the source tree location of the file is mapped to at least one of the automation tests by examining a mapping file that includes a mapping from a source tree location of the checked out file to an automated test;

automatically selecting the automation tests that are mapped to the source tree location of the file;

automatically selecting the automation tests that are identified within the mapping file the selection determining build verification tests mapped to the source tree location of the file, the build verification tests are configured to be run while code is checked out of the source tree; wherein the build verification tests are a subset of the automation tests;

automatically providing a list of the selected automation tests to the automation testing process;

automatically running the selected automation tests against a build of the software product, such that the build of the software product is compiled with the code change in the checked out file.

12. The computer-readable storage medium of claim 11, wherein code checked-out of the version control system indicates a change of code regardless of whether an actual change is made to the code.

13. The computer-readable storage medium of claim 11, wherein determining whether the source tree location of the file is mapped to at least one of the automation tests further comprises determining a best match set of automation tests to map to the file when the source tree location of the file is not mapped to at least one of the automation tests.

14. The computer-readable storage medium of claim 11, wherein the file is associated with a change of code when the file includes a code change.

15. The computer-readable storage medium of claim 11, wherein the file is associated with a change of code when the file is affected by a code change made elsewhere in the software product.

16. The computer-readable storage medium of claim 11, wherein the data source includes an entry that corresponds to an optimal mapping for the file.

17. The computer-readable storage medium of claim 11, wherein selecting the automation tests that are mapped to the source tree location of the file further comprises additionally selecting the automation tests according to which of the automation tests is also a build verification test.

18. The computer-readable storage medium of claim 11, wherein selecting the automation tests that are mapped to the source tree location of the file further comprises additionally selecting the automation tests according to which of the automation tests is also an enabled test.

19. The computer-readable storage medium of claim 11, further comprising repeating determining a source tree location of the file, determining whether the source tree location of the file is mapped to at least one of the automation tests, selecting the automation tests that are mapped to the source tree location of the file, and providing a list of the selected automation tests to the automation testing process when a new job is generated during the automation testing process.

\* \* \* \* \*

UNITED STATES PATENT AND TRADEMARK OFFICE
CERTIFICATE OF CORRECTION

PATENT NO. : 7,614,042 B1  
APPLICATION NO. : 11/041341  
DATED : November 3, 2009  
INVENTOR(S) : Donald G. Hardy et al.

Page 1 of 1

It is certified that error appears in the above-identified patent and that said Letters Patent is hereby corrected as shown below:

In column 8, line 43, in Claim 8, after "file" insert -- , --.

In column 9, line 18, in Claim 11, after "file" insert -- , --.

Signed and Sealed this  
Eighth Day of February, 2011

David J. Kappos  
*Director of the United States Patent and Trademark Office*